Feb. 3, 1931. C. H. HAPGOOD 1,790,859
WEIGHING SCALE
Filed Feb. 28, 1925
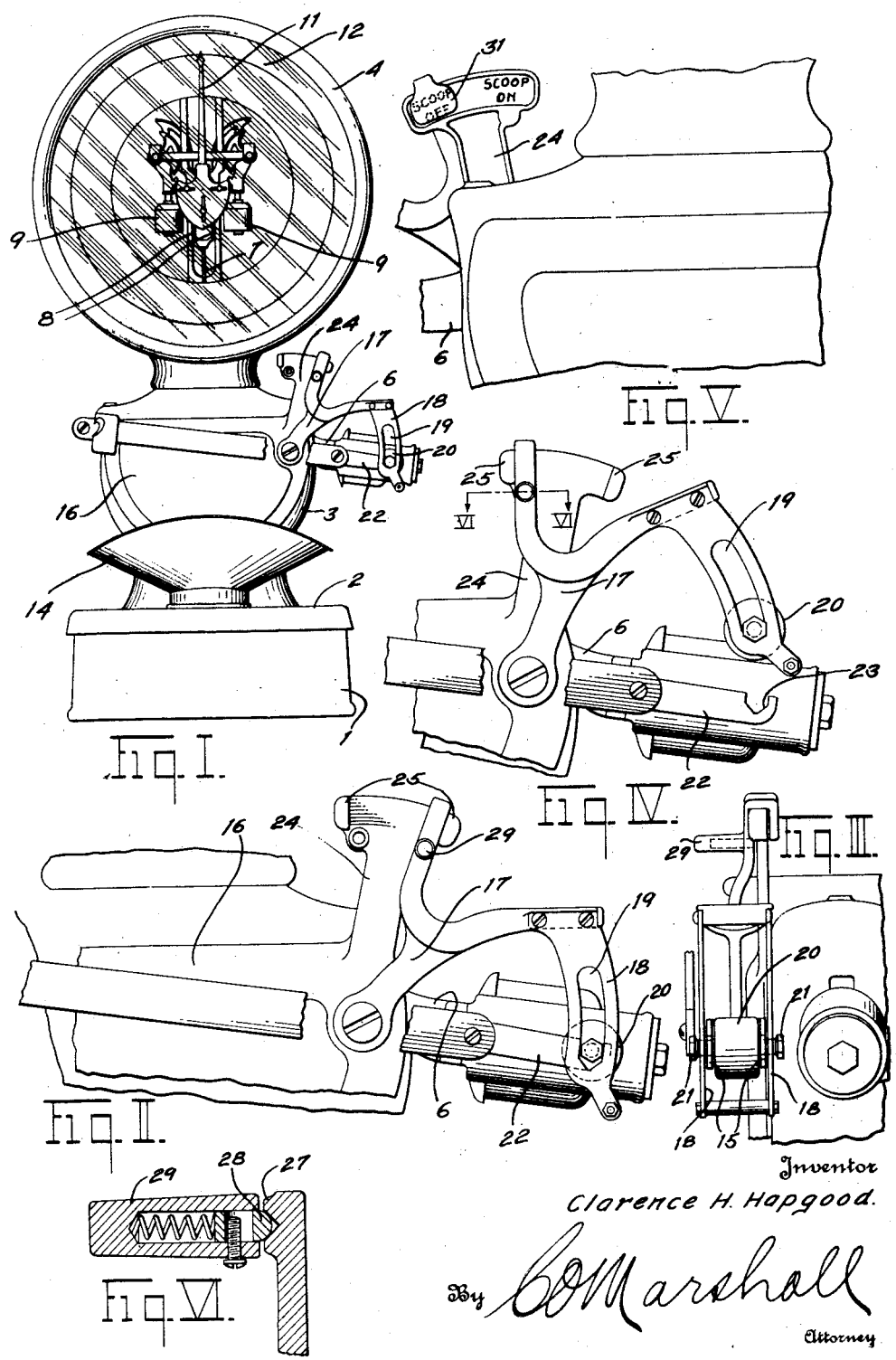
Inventor
Clarence H. Hapgood.
By COMarshall
Attorney Patented Feb. 3, 1931

1,790,859

UNITED STATES PATENT OFFICE

CLARENCE H. HAPGOOD, OF TOLEDO, OHIO, ASSIGNOR TO TOLEDO SCALE MANUFACTURING COMPANY, OF TOLEDO, OHIO, A CORPORATION OF NEW JERSEY

WEIGHING SCALE

Application filed February 28, 1925. Serial No. 12,229.

This invention relates to weighing scales, and more particularly to scales provided with auxiliary commodity receivers to be placed upon the platform to accommodate articles and commodities which the platform is not adapted to receive.

One of the principal objects of the invention is the provision of a simple and efficient device for rapidly balancing the scale when the auxiliary commodity receiver is placed upon or removed from the scale platform.

Another object is the provision of easily operated mechanism for placing the balancing device upon a scale lever and removing it therefrom without deranging the weighing mechanism, thus leaving the weighing mechanism entirely free to operate whether the balancing device be on or off.

Another object is the provision of a device for balancing the auxiliary commodity receiver which is so arranged that a weight may be deposited upon or removed from a lever, the mechanism for operating the weight being so constructed that the weight must be either entirely supported by the lever throughout weighing movements or removed therefrom so as not to engage said lever in any position of the latter.

Still another object is to provide a device of this character with a prominently displayed indicator to indicate to the customer whether the scale is in condition to weigh correctly with the auxiliary commodity receiver either on or off the platform.

Still a further object is the provision of a device of this character which is simple in construction and operation and which may be incorporated in weighing scales of known construction without necessitating material change in the mechanism thereof.

Other obejcts and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a weighing scale embodying my invention,
showing the auxiliary commodity receiver in position to receive articles to be weighed;

Figure II is an enlarged fragmentary front elevational view of the balancing weight and operating machanism therefor, showing the weight in position upon the lever;

Figure III is an end elevational view of the parts shown in Figure II;

Figure IV is a view similar to Figure II showing the weight removed from the lever in inactive position;

Figure V is a fragmentary rear elevational view of a portion of the scale showing means for indicating whether the auxiliary commodity receiver is on or off the platform; and

Figure VI is an enlarged fragmentary sectional view taken substantially on the line VI—VI of Figure IV.

Referring to the drawings in detail, the scale in which I have shown my invention as embodied consists of a base 1 containing the usual platform lever mechanism (not shown) upon which is supported a load-receiving platform 2. Erected upon one end of the base is an upright column 3 surmounted by a substantially watch-case-shaped housing 4 adapted to house and support the load counterbalancing and indicating mechanism. The platform lever mechanism is connected to an intermediate lever 6 suitably fulcrumed within the column 3 and connected by means of a rod 7 and flexible metallic ribbons 8 to a pair of load-counterbalancing pendulums 9. When a load is placed upon the scale platform 2 a downward force is exerted upon the rod 7 and ribbons 8, causing the pendulums 9 to swing outwardly and upwardly to counterbalance such load. An indicator hand 11 connected by means of rack and pinion mechanism (not shown) to the pendulum mechanism is adapted to swing over a chart 12 to indicate the weight of such load. This type of load-offsetting mechanism is more particularly described and claimed in my patent dated November 7, 1916, and as it per se is not the subject of my present invention I will not describe it in further detail.

The scale hereinbefore described is of a type suitable for regular weighings. In order to accommodate articles for weighing which owing to their sizes are not capable of being conveniently placed upon the platform 2, I have provided an auxiliary commodity-receiver 14 which may be in the form of a scoop to receive such articles as nails, screws and bolts, for example. When the scoop 14 is placed upon the platform the indicator hand must be returned to zero to prevent errors in reading, and the means for accomplishing this will now be described.

Pivoted to a cover plate 16 fixed to the front of the upright housing 3 is an arm 17 having depending portions 18 provided with elongated openings or slots 19. A cylindrical weight 20 is provided with axially aligned studs 21 which project into the slots 19. The lever 6 is provided with a U-shaped extension bracket 22 having notches 23 adapted to receive the weight 20. The plate 16 is formed with an upwardly projecting arm 24, the upper extremity of the arm having a pair of spaced forwardly projecting lugs or stops 25 adapted to limit the movement of the arm 17. It will be apparent that the arm 17 is capable of two positions—viz., that of Figure II, showing the weight as supported entirely upon the lever 6, and that of Figure IV, showing the weight supported in the lower extremities of the slots 19 out of engagement with the lever. In order to retain the arm 17 in its uppermost position—i. e., that in which the weight 20 is supported by the arm—I have constructed the fixed arm 24 with a recessed boss 27 which is adapted to receive a spring pressed plunger 28 slidably positioned within a bore in a handle member 29, the latter forming a part of the arm 17. The pressure of the spring need only be sufficient to overcome the tendency of the arm 17 and associated parts to swing or fall to its lowermost position, a slight pressure of the operator's hand being sufficient to move the plunger 28 out of the recess, the force of gravity acting to complete the downward movement of the arm and consequent disposition of the weight 20 upon the bracket 22 forming a part of the lever 6.

The pivotal axis of the arm 17 is substantially in alignment with the fulcrum pivot of the lever 6, and the slots 19 in the members 18 are so arranged with respect to the pivotal axis of the arm that with the weight 20 in engagement with the lever 6 the latter is free to oscillate throughout weighing movements. If it is desired to remove the weight 20 from the lever, an upward movement of the arm 17 causes the member 18 to engage the studs 21 of the weight, elevating the latter a sufficient distance above the bracket 22 as to be out of the path of normal movement of the bracket. The member 18 is so constructed that with the lever 6 in any position the member 18 will engage the weight 20 to move said weight out of engagement with the lever.

The rear face of the upper extremity of the fixed arm 24 bears two inscriptions, one of which is covered by a flaring portion or lip 31 forming a part of the movable arm 17. When the weight is upon the bracket 22, the inscription "Scoop on" is visible, the words "Scoop off" being occulted by the lip 31, and when the arm 17 is moved so as to lift the weight from the bracket the words "Scoop off" are uncovered and the words "Scoop on" hidden, thereby indicating to the customer the condition of the weighing mechanism.

In the operation of my device, when it is desired to weight a quantity of small articles the weight 20 may be placed upon the lever either before or after the scoop 14 is placed upon the platform. If the scoop is first placed upon the main platform it causes the indicator hand 11 to swing away from zero, indicating the weight of the scoop. The handle 29 is then grasped by the operator and the arm 17 moved to a position depositing the weight 20 upon the bracket 22 fixed to the end of the lever 6. This weight is sufficient to counterbalance the weight of the scoop, causing the indicator hand to return to zero, in which position the articles to be weighed may be placed in the scoop and the true or net weight thereof indicated upon the chart 12.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a frame, weighing mechanism including a lever supported upon said frame, a weight adapted to be placed upon said lever, means including a pivoted arm for shifting said weight onto and off of said lever, and resilient means for retaining said weight shifting means in a position with said weight out of engagement with said lever.

2. In a weighing scale provided with an auxiliary commodity-receiver, in combination, a frame, weighing mechanism including a lever supported upon said frame, a weight adapted to be placed upon said lever, means including an arm pivoted upon said frame for shifting said weight onto and off said lever whereby said weight operates when in engagement with the lever to offset the weight of the auxiliary commodity-receiver in bringing the scale to balance, and means for indicating the relative position of said weight.

3. In a scale, in combination, a housing, weighing mechanism supported within the housing, a lever fulcrumed within said housing, a weight adapted to be placed upon said lever, and means for shifting said weight onto and off of said lever, including an arm pivoted to the housing, the axis of said pivot being in alignment with the fulcrum of the lever.

4. In a scale provided with an auxiliary commodity-receiver, in combination, a housing, weighing mechanism supported within said housing, a lever fulcrumed within the housing and connected to said weighing mechanism, an auxiliary weight, means including an arm pivotally secured to said housing on an axis in alignment with the fulcrum of said lever for shifting said weight off and on said lever whereby said weight acts when in engagement with the lever to offset the weight of the auxiliary commodity-receiver in bringing the scale to balance, and means for indicating the relative position of said weight.

CLARENCE H. HAPGOOD.